(12) United States Patent
Richmond et al.

(10) Patent No.: US 9,791,635 B2
(45) Date of Patent: Oct. 17, 2017

(54) REMOTE GRIP MULTI-FIBER CONNECTOR

(71) Applicant: 3M INNOVATIVE PROPERTIES COMPANY, St. Paul, MN (US)

(72) Inventors: Mark R. Richmond, Austin, TX (US); Johnny P. Bryant, Georgetown, TX (US); Ding Wang, Austin, TX (US); James R. Bylander, Austin, TX (US); Nathan Stipek, Grapevine, TX (US)

(73) Assignee: 3M Innovative Properties Company, St. Paul, MN (US)

( * ) Notice: Subject to any disclaimer, the term of this patent is extended or adjusted under 35 U.S.C. 154(b) by 36 days.

(21) Appl. No.: 14/427,860

(22) PCT Filed: Aug. 12, 2013

(86) PCT No.: PCT/US2013/054516
§ 371 (c)(1),
(2) Date: Mar. 12, 2015

(87) PCT Pub. No.: WO2014/042799
PCT Pub. Date: Mar. 20, 2014

(65) Prior Publication Data
US 2015/0247979 A1    Sep. 3, 2015

Related U.S. Application Data

(60) Provisional application No. 61/700,149, filed on Sep. 12, 2012.

(51) Int. Cl.
*G02B 6/38* (2006.01)
*G02B 6/36* (2006.01)
*G02B 6/44* (2006.01)

(52) U.S. Cl.
CPC ............. *G02B 6/3839* (2013.01); *G02B 6/38* (2013.01); *G02B 6/3826* (2013.01); *G02B 6/3869* (2013.01); *G02B 6/3885* (2013.01)

(58) Field of Classification Search
CPC ...... G02B 6/38; G02B 6/3826; G02B 6/3839; G02B 6/3869; G02B 6/3806;
(Continued)

(56) References Cited

U.S. PATENT DOCUMENTS 3,018,262 A    1/1962   Schroeder
3,729,313 A    4/1973   Smith
(Continued)

FOREIGN PATENT DOCUMENTS

CN    1035897 A    9/1989
CN    202256764 U    5/2012
(Continued)

OTHER PUBLICATIONS

Search Report for CN2013800449922.1, dated Nov. 20, 2015, 3 pp.
(Continued)

*Primary Examiner* — Akm Enayet Ullah
*Assistant Examiner* — Michael Mooney
(74) *Attorney, Agent, or Firm* — Gregg H. Rosenblatt

(57) ABSTRACT

An optical fiber connector for terminating a fiber cable comprising a plurality of optical fibers, comprises an outer connector housing, a ferrule essentially free of adhesive, a backbone, and a collar body disposed between the ferrule and backbone. The collar body includes a remote gripping region to remotely grip the plurality of optical fibers outside of the ferrule. In some aspects, the collar body includes a fiber comb portion that separates potentially tangled fibers, arranges the plurality of fibers in a uniform pitch, and provides for straightforward feeding of the fiber array into ferrule bores during a fiber cable insertion process. In some aspects, the connector includes a resilient element disposed between the backbone and a rear portion of the collar body, and an intermediate spring element disposed between a front portion of the collar body and a rear portion of the ferrule.

19 Claims, 14 Drawing Sheets

(58) Field of Classification Search
CPC .. G02B 6/3836; G02B 6/3855; G02B 6/3858; G02B 6/3875
USPC ............................................. 385/53–87, 114
See application file for complete search history.

(56) References Cited

U.S. PATENT DOCUMENTS

| | | | |
|---|---|---|---|
| 3,741,769 | A | 6/1973 | Smith |
| 3,808,006 | A | 4/1974 | Smith |
| 4,250,053 | A | 2/1981 | Smith |
| 4,394,403 | A | 7/1983 | Smith |
| 4,642,126 | A | 2/1987 | Zador |
| 4,921,325 | A * | 5/1990 | Iri |
| 4,984,865 | A | 1/1991 | Lee |
| 5,082,346 | A | 1/1992 | Myers |
| 5,545,676 | A | 8/1996 | Palazzotto |
| 5,923,803 | A | 7/1999 | Bunin |
| 6,045,271 | A | 4/2000 | Shimoji |
| 6,095,695 | A | 8/2000 | Ohtsuka et al. |
| 6,331,080 | B1 | 12/2001 | Cole |
| 6,439,780 | B1 | 8/2002 | Mudd |
| 6,474,878 | B1 | 11/2002 | Demangone |
| 6,811,323 | B2 | 11/2004 | Murray |
| 7,077,576 | B2 | 7/2006 | Luther |
| 7,369,738 | B2 | 5/2008 | Larson et al. |
| 7,429,136 | B2 | 9/2008 | Lewallen |
| 7,775,726 | B2 | 8/2010 | Pepin et al. |
| 2002/0110333 | A1 | 8/2002 | Yang |
| 2005/0123248 | A1 | 6/2005 | Sakurai |
| 2012/0093465 | A1 | 4/2012 | Danley |

FOREIGN PATENT DOCUMENTS

| | | |
|---|---|---|
| EP | 0 324 272 A2 | 7/1989 |
| JP | H01-101205 U | 7/1989 |
| JP | 2896872 | 2/1997 |
| JP | 2004-004333 | 1/2004 |
| JP | 2007-264018 A | 10/2007 |
| WO | WO 93/21547 | 10/1993 |
| WO | WO 99/57786 | 11/1999 |
| WO | WO 2006/029299 | 3/2006 |
| WO | WO 2009/148797 | 12/2009 |

OTHER PUBLICATIONS

Search Report for CN201380044992.1, dated Dec. 30, 2016, 3 pp.
Weinberg, "Technique of Electroorganic Synthesis", Techniques of Chemistry 1975, vol. V, Part II, pp. 1-559.
International Search Report for PCT International Application No. PCT/US2013/054516 mailed on Nov. 27, 2013, 4 pages.
Search Report for CN201380044992.1, dated Jun. 21, 2016, 2 pp.
Extended European Search Report for EP13837516.7, dated Jul. 27, 2016, 6 pp.
Supplementary Partial Search Report for EP13837516.7, dated Apr. 29, 2016, 5 pp.
Search Report for CN201380044992.1, dated Nov. 20, 2015, 3 pp.

* cited by examiner

REMOTE GRIP MULTI-FIBER CONNECTOR

BACKGROUND

Field of the Invention

The present invention is directed to a multi-fiber optical connector.

Related Art

Telecommunications and data centers require increasing data processing speeds and performance characteristics. Multi-fiber optical connectors are known for telecommunications and data center applications. Such connectors are based on the well-known, standard MT ferrule, which can house anywhere from a single optical fiber to several dozen optical fibers. Connectors using the MT ferrule, such as the MPO and MTP, are typically mounted to the fiber cables in a factory setting. MTP® is a registered mark of US Conec Ltd.

Example multi-fiber connectors are described in U.S. Pat. Nos. 5,082,346 and 6,474,878.

A field mount (or field mountable) MPO connector is commercially available, known as the Unicam MTP connector, from Corning Inc. See also U.S. Pat. No. 6,439,780.

But such field mount connectors can require significant training and costs, as installation processes (e.g., polishing, alignment) for such multi-fiber connectors are challenging.

SUMMARY OF THE INVENTION

According to a first aspect of the present invention, an optical fiber connector for terminating a fiber cable comprising a plurality of optical fibers, comprises an outer connector housing, a ferrule essentially free of adhesive, a backbone, and a collar body disposed between the ferrule and backbone. The collar body includes a remote gripping region to remotely grip the plurality of optical fibers outside of the ferrule.

In another aspect, the optical fiber connector further comprises a resilient element disposed between the backbone and a rear portion of the collar body, and an intermediate spring element disposed between a front portion of the collar body and a rear portion of the ferrule. In some aspects, the intermediate spring element has a compression value of about 340 gram force to about 740 gram force.

In another aspect, the remote gripping region is configured to receive a clamping mechanism that secures the axial position of the plurality of optical fibers within the collar body.

In an alternative aspect, the remote gripping region is configured to receive an adhesive that secures the axial position of the plurality of optical fibers within in the collar body. In some aspects, the adhesive comprises a fast curing adhesive.

In another aspect, the collar body includes a fiber comb portion disposed at a front portion of the collar body, where the fiber comb portion includes an array of grooves, with each groove configured to guide an optical fiber disposed therein. In some aspects, the fiber comb portion further includes a ramp section adjacent the groove array, the ramp section including a gradual rising portion. In some aspects, the fiber comb portion separates potentially tangled fibers, arranges the plurality of fibers in a uniform pitch, and provides for straightforward feeding of the fiber array into ferrule bores during a fiber cable insertion process.

According to another aspect of the present invention, an optical fiber connector for terminating a fiber cable comprising a plurality of optical fibers, comprises an outer connector housing, a ferrule, a backbone, and a collar body disposed between the ferrule and backbone. The collar body includes a fiber comb portion disposed at a front portion of the collar body, where the fiber comb portion includes an array of grooves, with each groove configured to guide an optical fiber disposed therein into the ferrule.

According to another aspect of the present invention, an optical fiber connector for terminating a fiber cable comprising a one or more optical fibers, comprises an outer connector housing, a ferrule, a backbone, a collar body disposed between the ferrule and backbone, a tension element disposed between the backbone and a rear portion of the collar body, and an intermediate spring element disposed between a front portion of the collar body and a rear portion of the ferrule.

According to another aspect of the present invention, an optical fiber connector for terminating a fiber cable comprising a plurality of optical fibers comprises an outer connector housing, a ferrule, a backbone, and a collar body disposed between the ferrule and backbone. The collar body includes at least two guide holes configured to secure anti-rocking pins inserted in the guide holes, the anti-rocking pins, when mounted, extending into corresponding channels formed in the ferrule.

In some aspects, the outer connector housing is configured to be received in a MPO receptacle.

In some aspects, the ferrule comprises an MT ferrule.

In some aspects, the backbone further includes a mounting structure that provides for coupling to a fiber boot.

The above summary of the present invention is not intended to describe each illustrated embodiment or every implementation of the present invention. The figures and the detailed description that follows more particularly exemplify these embodiments.

BRIEF DESCRIPTION OF THE DRAWINGS

The present invention will be further described with reference to the accompanying drawings, wherein.

Figure 1:
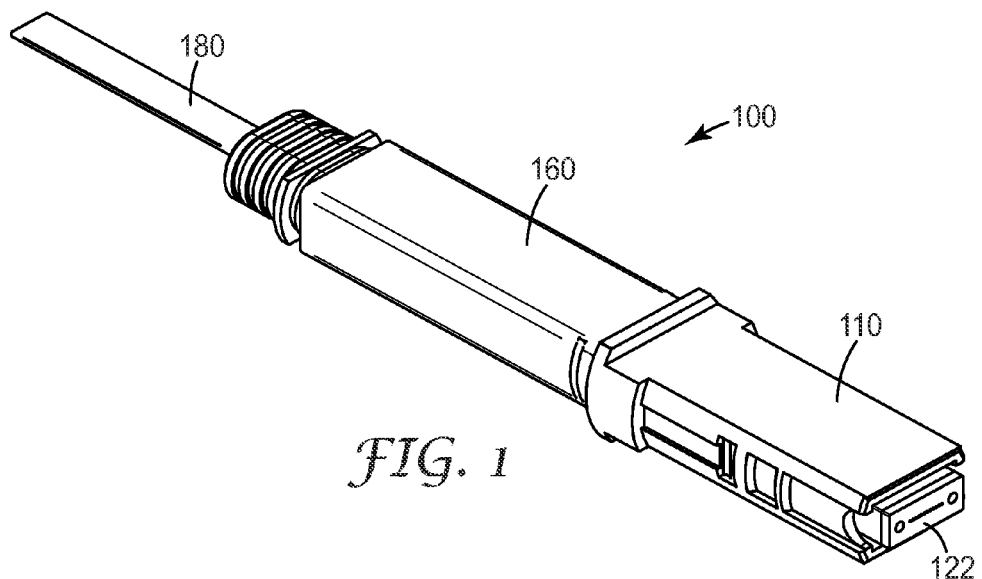
FIG. 1 is an isometric view of an optical fiber connector according to an aspect of the invention.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the scope of the invention as defined by the appended claims.

DETAILED DESCRIPTION OF THE EMBODIMENTS

In the following Detailed Description, reference is made to the accompanying drawings, which form a part hereof, and in which is shown by way of illustration specific embodiments in which the invention may be practiced. In this regard, directional terminology, such as "top," "bottom," "front," "back," "leading," "forward," "trailing," etc., is used with reference to the orientation of the Figure(s) being described. Because components of embodiments of the present invention can be positioned in a number of different orientations, the directional terminology is used for purposes of illustration and is in no way limiting. It is to be understood that other embodiments may be utilized and structural or logical changes may be made without departing from the scope of the present invention. The following detailed description, therefore, is not to be taken in a limiting sense, and the scope of the present invention is defined by the appended claims.

The present invention is directed an optical fiber connector. In many embodiments, the optical fiber connector is configured to terminate multiple optical fibers. In particular, the multi-fiber optical connector can be field terminated (meaning it can be installed, and/or terminated in the field) or factory terminated. The multi-fiber optical connector can be used to terminate a ribbonized fiber cable. A fiber comb structure utilized in the multi-fiber optical connector reduces the complexity of field mounting multiple optical fibers by providing a straightforward mechanism to simultaneously feed all of the fibers into the connector ferrule. In addition, the multi-fiber optical connector of the present invention utilizes a remote gripping technique, where the fibers will be secured outside of the ferrule, which eliminates the need for fiber stubs and the use of index matching gel. In addition, this structure means that the connector ferrule is essentially free of adhesive, allowing the fibers to move, float, and/or bow within the ferrule. Such a field mountable connector can be used in a variety of applications, including fiber-to-the-home installations, fiber-to-the-antenna installations, local area networks, data center connections, and high performance computing, to name a few.

According to a first exemplary embodiment of the present invention, an optical fiber connector 100, and components thereof, is shown in several views in FIGS. 1-13. Another exemplary optical fiber connector 200, and components thereof, is shown in several views in FIGS. 14-26. These optical fiber connectors can be terminated in the field or in the factory.

Optical connector 100 is configured to mate with a receptacle. For example, the receptacle can be a connector coupling, a connector adapter and/or a connector socket. Also, as shown in FIG. 1, exemplary optical connector 100 is configured as having an MPO (multi-fiber push-on) format. As such, connector 100, in one aspect, is compatible with MTP™ series connectors (MTP™ is a registered mark of US Conec Ltd, Hickory, N.C.). In one aspect, connector 100 is configured to meet the requirements of TIA/EIA Standard FOCIS-5. However, as would be apparent to one of ordinary skill in the art given the present description, optical connectors having other multi-fiber formats can also be provided.

Optical connector 100 is configured as a multi-fiber optical connector. In the exemplary embodiments described herein, connector 100 (and connector 200, described in detail below) includes at least 12 optical fibers. As would be apparent to one of ordinary skill in the art given the present description, optical connector 100 can be modified to include fewer optical fibers or a greater number of optical fibers.

Figure 2:
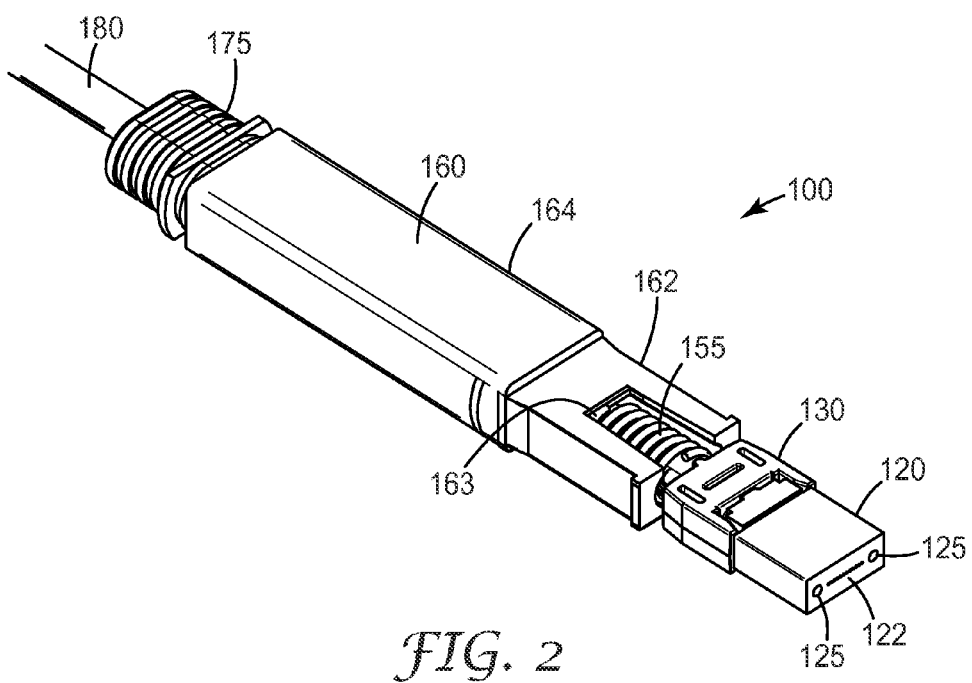
FIG. 2 is another isometric view of the optical fiber connector of FIG. 1 according to an aspect of the invention.
Figure 3:
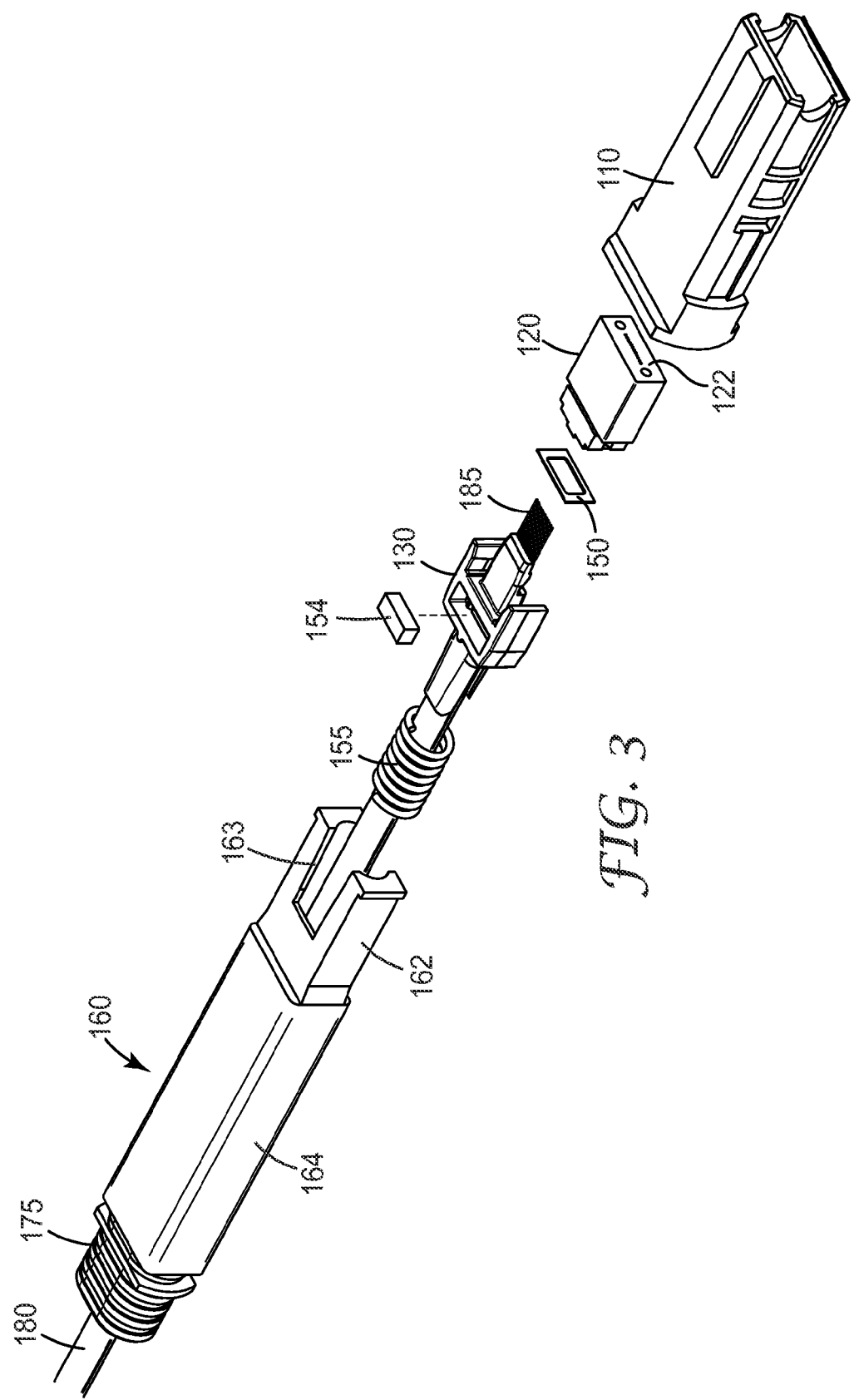
FIG. 3 is an exploded view of the optical fiber connector of FIG. 1 according to an aspect of the invention.

Optical fiber connector 100 can include a connector body (or outer housing shell) 110 that houses the terminal ends of fibers from fiber cable 180. In this exemplary embodiment connector body 110 is configured to be received in a MPO receptacle. FIG. 1 shows a first side of connector body 110, while FIG. 3 shows a second (opposite) side of connector body 110. Optical connector 100 also includes a collar body 130, a ferrule 120 (see FIG. 2) and a backbone 160. At least a portion of backbone 160 (in this aspect, front portion 162) is housed inside the connector body 110.

In one aspect, ferrule 120 can be a commercial ferrule, such as a standard MT ferrule commercially available from vendors such as US Conec (Hickory N.C.). Ferrule 120 houses the stripped ends of the terminated fibers, which terminate at front face 122 in a series of closely spaced holes or bores. Ferrule 120 aligns the fibers so that they can be mated with another ferrule (not shown). Guide holes 125 for alignment pins (not shown in this aspect) can also be provided on the front face of ferrule 120. In addition, the ferrule 120 of this aspect, shown in FIGS. 2, 3, and 11-13, is slightly modified from its commercial design, having a tapered body near the rear end (i.e., the end positioned closest to the collar body 130). As described in further detail below, as the fiber connector 100 is a remote grip connector, the ferrule 120 can be essentially adhesive-free. Ferrule 120 can be formed from a ceramic, glass, plastic, or metal material. The choice of suitable materials for the ferrule can be made in accordance with temperature stability parameters.

Backbone 160 provides structural support and retention for the connector 100. As shown in FIGS. 1 and 2, backbone 160 includes a front portion 162 configured to secure the connector body 110 (e.g., via a snap or friction fit). The front portion 162 can also include a slot 163 configured to accommodate a resilient element or main spring, such as spring 155, which provides a bias force. For example, spring 155 of fiber connector 100 can preload a suitable force onto the connector body of up to about 1200 gram force. In one aspect, spring 155 can preload a force onto the connector body of about 1100 gram force. Backbone 160 can also include a body portion 164, which can have a substantial length sufficient to completely cover any stripped portion of fiber cable 180. In an alternative aspect, the body portion of the backbone can be substantially shorter in length. In addition, backbone 160 can further include a mounting structure 175 (opposite the front portion 162) that provides for coupling to a fiber boot (not shown), which can be utilized to protect the optical fiber cable from bend related stress losses. According to an exemplary embodiment of the present invention, connector body 110 and backbone 160 can be formed or molded from a polymer material, although metal and other suitably rigid materials can also be utilized.

Connector 100 further includes a collar body 130 that is disposed within the connector housing and retained therein. According to exemplary embodiments, the collar body 130 is a multi-purpose element that can provide for orderly insertion of the optical fibers into the ferrule 120 and to provide support for a fixing mechanism 154 (see FIG. 3) disposed in a remote gripping region of the collar body that secures the fibers within the connector 100. The fixing mechanism 154 provides for remote gripping of the fibers being terminated and is located outside of the ferrule 120. In this respect, the fibers are not attached to the ferrule but axially move within the alignment holes of the ferrule. In one aspect, the fixing mechanism 154 can be located at a remote gripping region 146 that includes a pocket 134 (see e.g., FIG. 5) of the collar body 130. A smaller slot or opening 132 can be formed opposite pocket 134. Additional slots and openings (such as slots 138a and 138b, shown in FIG. 4) can also be provided in body portion 131 to accommodate for features of the clamping mechanism, if needed. The fixing mechanism 154 can comprise a mechanical clamp that grips or presses onto the fibers to secure them in place within the collar body 130. Alternatively, fixing mechanism 154 can comprise an adhesive attachment, such as a fast-curing UV or visible light initiated adhesive or a thermally activated adhesive, such as a hot-melt material. Further details regarding the fixing mechanism 154 are provided below.

Figure 4:
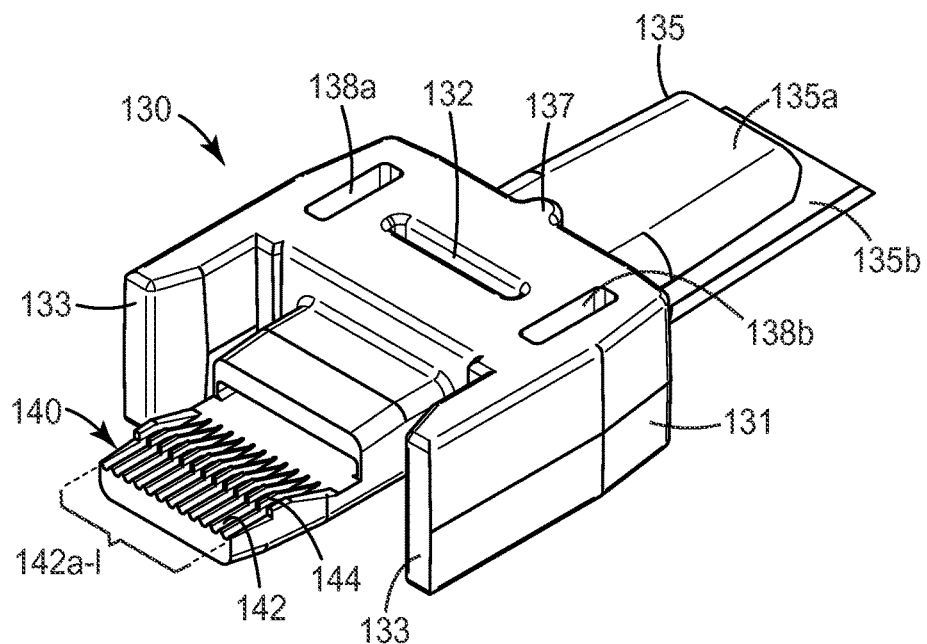
FIG. 4 is an isometric view of the collar body of the optical fiber connector of FIG. 1 according to an aspect of the invention.
Figure 5:
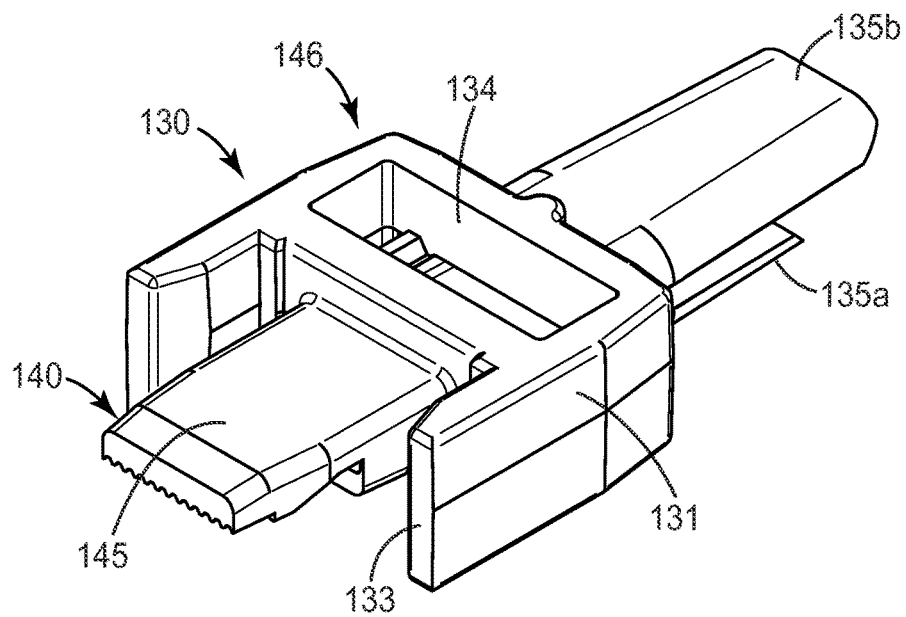
FIG. 5 is another isometric view of the collar body of the optical fiber connector of FIG. 1 according to an aspect of the invention.
Figure 6:
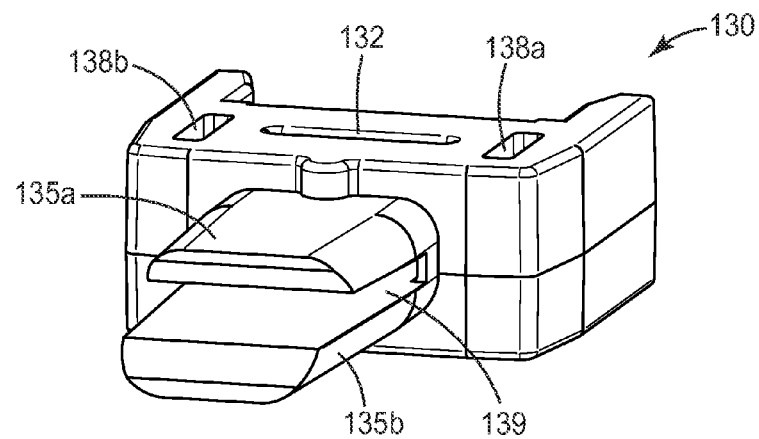
FIG. 6 is another isometric view of the collar body of the optical fiber connector of FIG. 1 according to an aspect of the invention.
Figure 7:
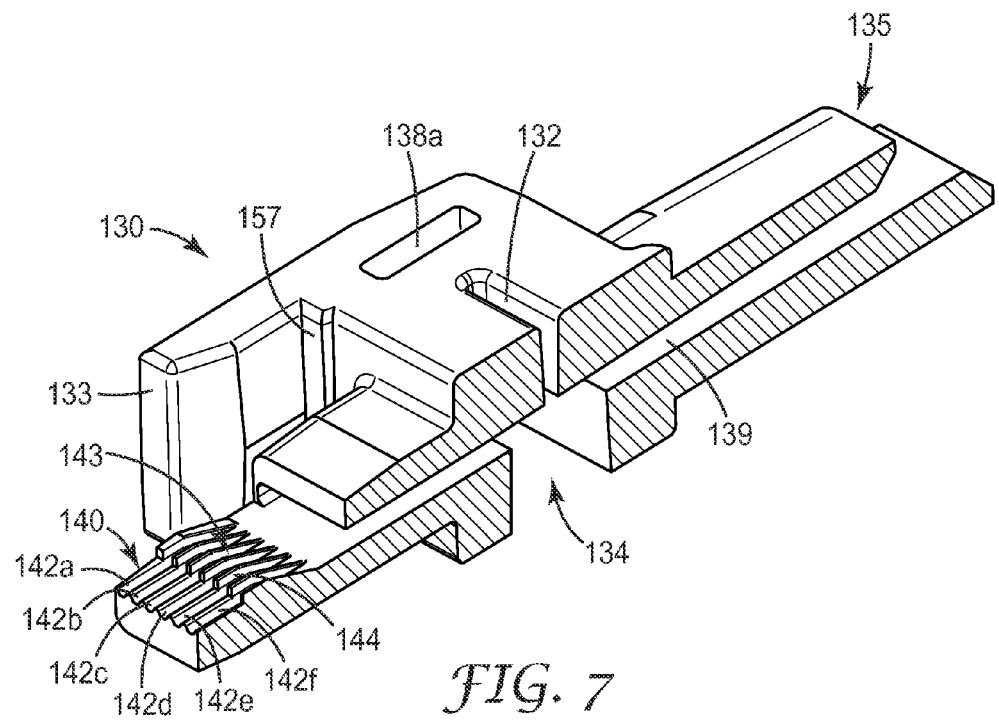
FIG. 7 is an isometric cross-section view of the collar body of the optical fiber connector of FIG. 1 according to an aspect of the invention.

In particular, FIGS. 4 and 5 show a bottom view and a top view, respectively, of collar body 130. Collar body 130 includes a fiber comb portion 140 that is used to support, align and guide the optical fibers to be terminated. The fiber comb portion 140 includes a top surface 145 (see FIG. 5) and an array of grooves 142 (see FIG. 4), located on the underside of surface 145, disposed on an end of the collar body 130 (nearest the ferrule 120 when assembled), with each individual groove or channel 142a-142l configured to guide and support a single optical fiber of the fiber cable 180. The fiber comb portion 140 also includes a ramp section 144 adjacent groove array 142 and disposed between the groove array 142 and the main body portion of the collar body 130. The ramp section 144 includes gradual rising structures 143, such as teeth or walls separating the individual grooves (see e.g., the cross section view shown in FIG. 7) that can be used to help align the individual fibers during the fiber insertion process (to be described in greater detail below). The structure of the fiber comb portion 140 separates potentially tangled fibers, arranges the fiber array in a uniform pitch, and allows for straightforward feeding of the fiber array into the ferrule bores. In addition, the groove array/ramp structure of the fiber comb portion allows for precision placement of the fiber array with the naked eye.

Figure 8:
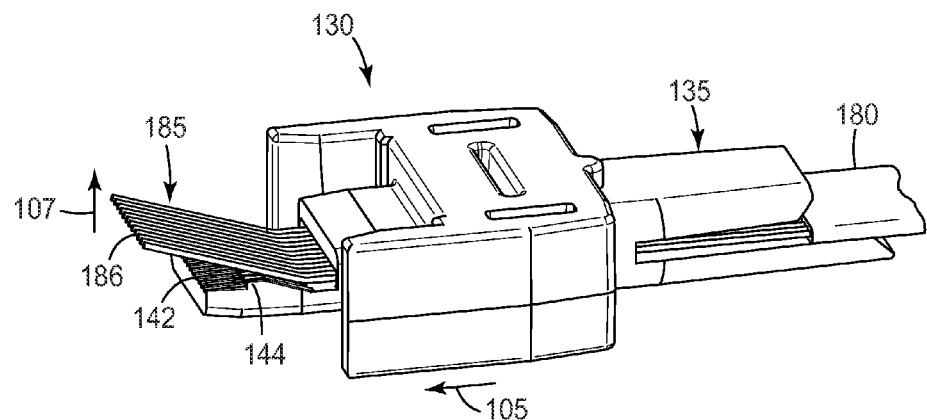
FIG. 8 is an isometric view of the collar body of the optical fiber connector of FIG. 1, with fibers being inserted, according to an aspect of the invention.
Figure 9:
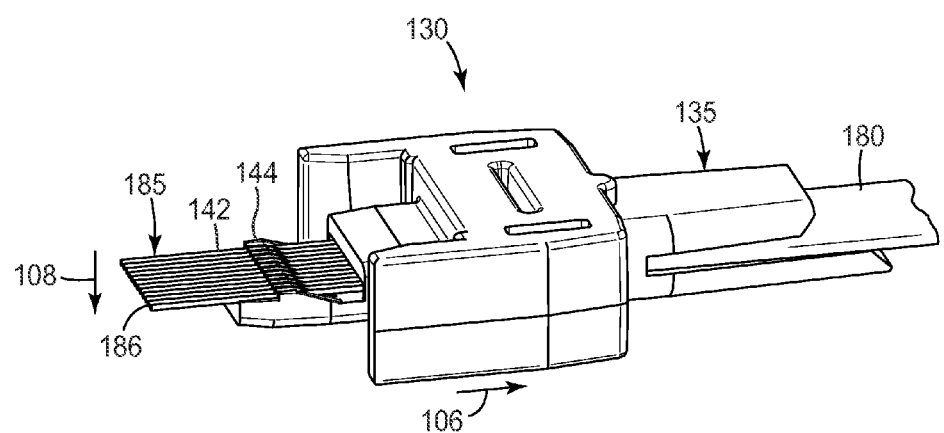
FIG. 9 is another isometric view of the collar body of the optical fiber connector of FIG. 1, with fibers being inserted, according to an aspect of the invention.

Collar body 130 also includes a rear portion 135 having an opening 139 (see FIGS. 6 and 7) that allows for insertion of the fiber cable 180 (see e.g., FIGS. 8 and 9). In one aspect, the rear portion 135 includes extending support structures 135a and 135b (disposed opposite each other about opening 139). In addition, rear portion 135 is also configured to receive and support tension element/spring 155 (see e.g., FIGS. 2 and 3). A contact bump or protrusion 137 can be formed on the rear portion of the collar body 130 to contact spring 155 and centers the force of the spring to the collar body. Thus, when fiber connector 100 is assembled, the resilient element/spring 155 will be disposed between the collar body 130 and the backbone 160 (see e.g., FIG. 2).

In the exemplary aspect of optical connector 100, as shown in FIGS. 4-5, collar body 130 can further comprise wing portions 133 located on either side of main body portion 131. Wings 133 can be provided to help limit the relative movement of the ferrule 120 when the connector is fully assembled. In one aspect, when the connector 100 is fully assembled, but not mated with another connector or receptacle, a control gap or space 129 exists between the wings 133 of the collar body and the rear shoulders 123 of the ferrule (see FIG. 11). This control gap or space 129 helps prevent too much relative movement between these elements (and subsequently, too much force being placed on the fiber ends during connector mating).

Figure 12:
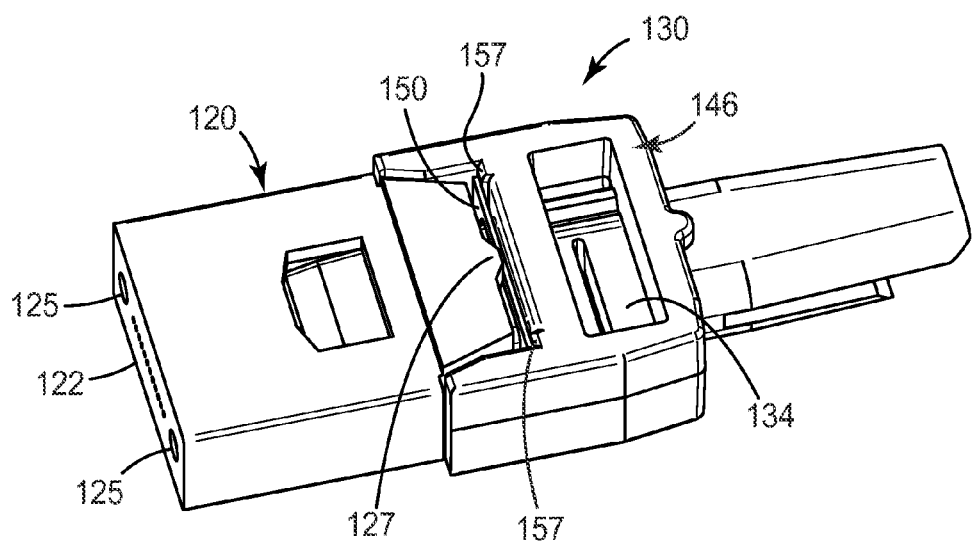
FIG. 12 is an isometric view of the collar body and ferrule of the optical fiber connector of FIG. 1 according to an aspect of the invention.
Figure 13:
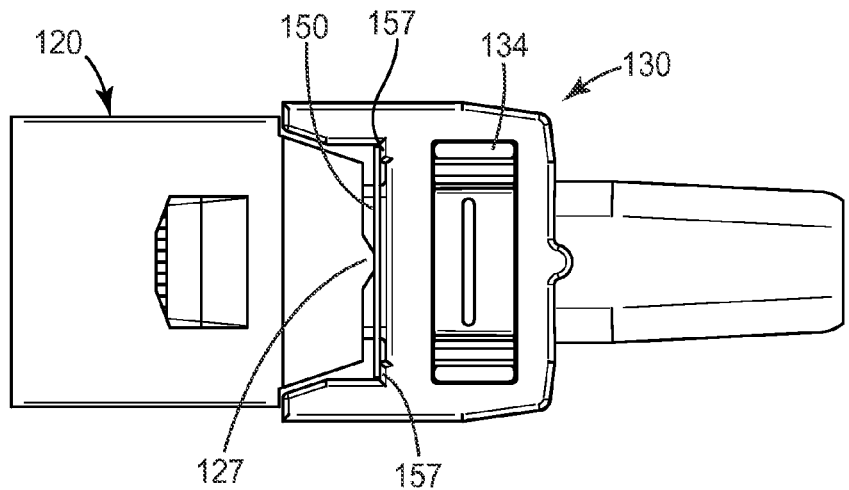
FIG. 13 is another view of the collar body and ferrule of the optical fiber connector of FIG. 1 according to an aspect of the invention.

To further help control the force placed on the fiber ends when connected, a small spring element 150, or intermediate spring, such as a flat or leaf spring, can be disposed between the collar body 130 and ferrule 120. In particular, spring element 150 can be seated on a shelf or shoulder portion 157 of the collar body (see e.g., FIGS. 7 and 13). In one aspect, intermediate spring 150 can provide a countering force (e.g., where it counters or dampens the force placed on the mated fibers) of from about 300 gram force to about 750 gram force. As shown in FIGS. 12 and 13, ferrule 120 includes a protrusion or bump 127 located on a rear portion thereof (opposite front face 122) that provides a point of contact with spring element 150 and helps center the force applied by the spring element 150. The spring element 150 enables a desired ratio of spring forces to be applied to the fibers being terminated and helps balance the forces within the connector 100. Thus, after connector mating, the spring element 150 can isolate the ferrule 120. Further description of the operation of the small spring element/intermediate spring is provided below.

The actual force applied to the fiber array ends can be controlled by tuning the compressive force of the intermediate spring to create a variable resulting force on the fiber array. By using this configuration, the multi-fiber connector(s) of the present invention can utilize the spring forces of the fiber array, the intermediate spring and the main spring to achieve a force balance, such as described in the following equation:

$$F_{ms}=F_{fa}-F_{is}$$

Where:
$F_{ms}$ is the force of the main spring
$F_{fa}$ is the natural force of the fiber array
$F_{is}$ is the force of the intermediate spring Under the TIA/EIA 604-5-A FOCIS-5 Type MPO standard, the requirements on ferrule travel and contact force are given by the following table (assuming a 12 fiber ribbon cable):

| Gram Force Limits | Fiber Array Force (Total) | Fiber Array Force (per fiber) | Intermediate Spring Force | Main Spring Force |
|---|---|---|---|---|
| Upper Limit | 756 | 63 | 344 | 1100 |
| Lower Limit | 360 | 30 | 740 | 1100 |
| Mid-Point | 558 | 46.5 | 542 | 1100 |

According to an aspect of the present invention, collar body 130 can be formed or molded from a polymer material, although metal and other suitable materials can also be utilized. For example, collar body 130 can comprise an injection-molded, integral material. The choice of suitable materials for the collar body can be made in accordance with the temperature stability parameters.

As mentioned above, connector 100 can be terminated in the factory or in the field. For example, in conjunction with the illustrations provided in FIGS. 8-10, field termination of connector 100 can be accomplished as follows.

The back end of the connector 100, including a boot (not shown), backbone 160, spring 155, and collar body 130, can be threaded onto the fiber cable 180. In this example, fiber cable 180 comprises a ribbon cable having 12 fibers. These fibers are identified as fibers 185, where the fiber ends 186 are individually accessible as the outer jacket portion of the ribbon cable 180 has been stripped off at the fiber ends 186. In one aspect, the fibers 185 being terminated in connector can comprise standard single mode or multimode optical fibers, such as SMF 28, OM2, OM3, or OM4 fiber ribbon cable (available from Corning Inc.). In an alternative aspect, cable 180 can further include a cable jacket portion and strength members. The strength members can be crimped onto the rear portion of the backbone 160 via a conventional crimp ring or similar device to provide strain relief for the terminated cable.

As is shown in FIG. 8, the fiber ribbon 180 can be inserted through the collar body 130, through rear portion 135, in the direction of arrow 105, until the fiber tips extend well beyond the end of the grooves 142 of fiber comb 140. The design of the collar body 130 constrains the ribbon cable 180 on either side to grossly align the fibers with the fiber grooves of the comb portion 140. As the fibers 185 are inserted, the ramp area 144 forces the fiber tips, as a group, to bow or rise upward, in the direction of arrow 107.

The fibers 185 can be stripped to the desired length. In one aspect, fibers 185 can be stripped to a length of between 8 mm and 15 mm, preferably about 11 mm.

Figure 10:
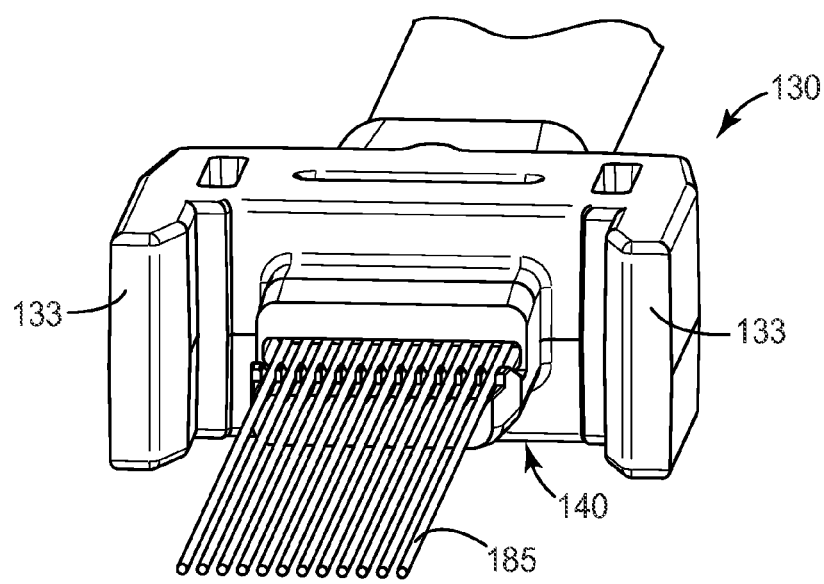
FIG. 10 is an isometric front view of the collar body of the optical fiber connector of FIG. 1, with fibers inserted, according to an aspect of the invention.

As shown in FIG. 9, the ribbon cable 180 can then be pulled back (in the direction of arrow 106), which causes each of the individual fibers to drop or fall (in the direction of 108) into the individual fiber grooves 142a-142l essentially simultaneously, as the un-stripped ribbon coating slides down the ramp 144, allowing the fibers 185 to relax from their bowed/raised state. Alternatively, an installer can move the collar body towards the fiber tips to accomplish the same result. Thus, as is shown in FIG. 10, all of the individual fibers 185 can be located in their respective individual grooves 142a-142l without the need for precision locating of each individual fiber by the field installer.

Figure 11:
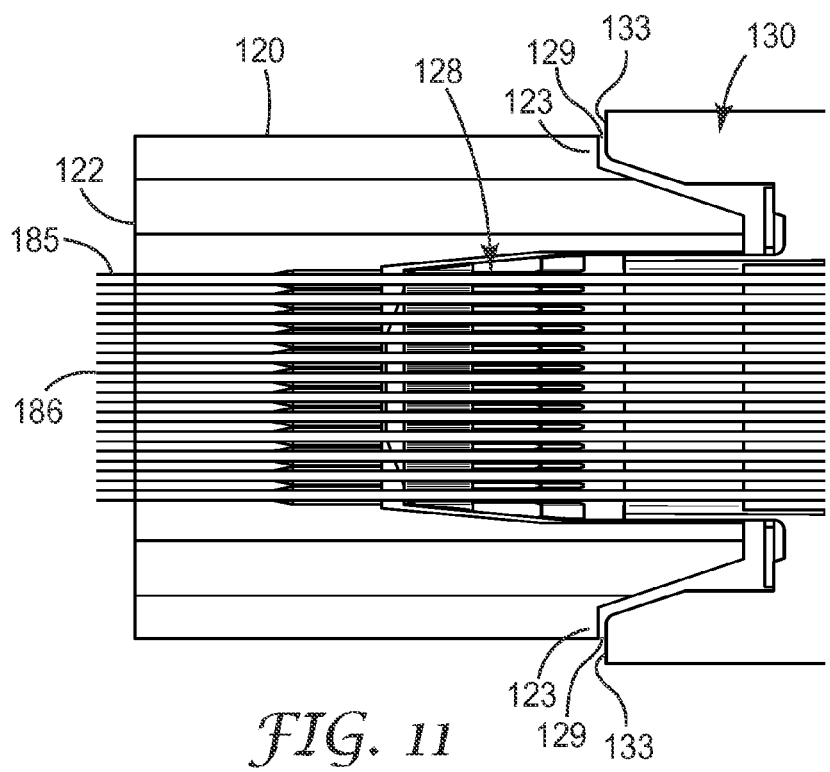
FIG. 11 is a top sectioned view of a portion of the collar body and ferrule of the optical fiber connector of FIG. 1, with fibers inserted, according to an aspect of the invention.

Once the individual fibers 185 are located within each individual channel or groove 142, the ferrule 120 can be slid over the fiber comb 140 of the collar body, as shown in FIG. 11, thereby positioning the fibers 185 in the proper ferrule bores. The outer dimensions of the front end of the body mate with the pocket in the ferrule with sufficient accuracy so that the fibers can now be pushed smoothly forward through the ferrule bores with high confidence that they will not encounter interference. In one aspect, the fibers 185 each have an outer diameter of about 125 μm and the ferrule 120 includes an array of lead-in bores 128 each having an opening of about 250 μm.

The fiber tips can then be slid to the front edge of the fiber comb to protect and align the fiber tips. The intermediate spring and ferrule can then be slid into position over the fiber comb. The aligned fiber tips can then be slid into the lead-in bores of the ferrule, until the fiber tips extend beyond the front face 122 of the ferrule.

As is shown in FIG. 11, the ends 186 of fibers 185 extend some distance from the front face 122 of the ferrule (for later cleaving and polishing). The protrusion allows the installer to cleave and polish the fiber tips at a later time.

The fixing mechanism 154 can then be activated such that the fibers 185 are secured in the remote gripping region 146 of the collar body. As mentioned above, in one aspect, the fixing mechanism 154 comprises a mechanical clamp that grips or otherwise presses onto the fibers to secure them in place within the collar body 130. For example, the fixing mechanism 154 can comprise a simple pressing plate and locking device. In an alternative aspect, an adhesive attachment can be utilized. Appropriate adhesives include fast-curing UV or visible light initiated adhesives and thermal adhesives, such as hot-melt material.

For example, a fast-curing adhesive can be used to bond the optical fibers to the interior of the pocket area of the collar body. In one aspect, the adhesive mechanism can comprise a composition that includes an adhesive having a viscosity from about 10 centipoise to about 5000 centipoise, a colorant, which is soluble in the adhesive to show the installer when the adhesive is distributed inside the pocket area, and an initiator system to cure the composition by exposure to such radiation, the composition preferably having a cure onset up to about 60 seconds with formation of the second color, more preferably up to about 30 seconds.

The connector backbone 160 and connector body housing 110 can then be assembled over the collar body 130/ferrule 120 via snap fit of tab features.

The fiber ends 186 can then be cleaved and polished. In one aspect, a clamping puck can be utilized to hold the assembled connector such that the position of the collar body relative to the ferrule remains constant during cleaving and polishing. In one swooping motion, the fiber array is then cleaved at the face of the ferrule, leaving relatively short (<500 µm) fiber protrusions across the fiber array. In one aspect, a conventionally available VF-45 cleaver (3M Company) can be utilized. In a preferred aspect, the fiber ends 186 are then polished to flush or near flush with respect to ferrule front face 122.

During connection, the structure of connector 100 can provide for a suitable distribution of forces so that an excessive amount of force is not directly applied to the fiber that could cause damage. By clamping the fibers remotely, a length (about 7 mm in the embodiment of FIGS. 1-13) of the fiber array between the front of the mechanical clamp 154 and the end face of the ferrule 122 is free to compress axially as force from a mating connector is applied to the fiber end-faces. As a mating force is applied to the individual fibers, each fiber is pushed reward within the ferrule bores, creating a compressive force, in the forward direction, on the mating fibers. This compressive force is required to maintain fiber-to-fiber physical contact as the assembly expands and contracts during thermal changes.

According to an alternative embodiment of the present invention, an optical fiber connector 200 and components thereof are shown in FIGS. 14-26. Similar to connector 100, exemplary optical connector 200 is configured as having an MPO format. As such, connector 200 can be compatible with MTP™ series connectors. In one aspect, connector 200 is configured to meet the requirements of TIA/EIA Standard FOCIS-5. However, as would be apparent to one of ordinary skill in the art given the present description, optical connectors having other multi-fiber formatscan also be provided.

Optical connector 200 is configured as a multi-fiber optical connector. In this exemplary embodiment, connector 200 includes 12 optical fibers. Again, as with connector 100 above, as would be apparent to one of ordinary skill in the art given the present description, optical connector 200 can be modified to include fewer optical fibers or a greater number of optical fibers.

Optical fiber connector 200 can include a connector body (or outer housing shell) 210 that houses the terminal ends of fibers from fiber cable 280. In this exemplary embodiment connector body 110 is configured to be received in a MPO receptacle. Optical connector 200 also includes a collar body 230, a ferrule 220 (see FIG. 15) and a backbone 260. At least a portion of backbone 260 (in this aspect, front portion 262) is housed inside the connector body 210.

In one aspect, ferrule 220 can be a commercial ferrule, such as a standard MT ferrule commercially available from vendors such as US Conec (Hickory N.C.). Ferrule 220 houses the stripped ends of the terminated fibers, which terminate at front face 222 in a series of closely spaced holes or bores. Ferrule 220 aligns the fibers so that they can be mated with another ferrule (not shown). Alignment pins 226 can also be provided on the front face of ferrule 220 to provide for mating alignment and stability with another connector or receptacle. These alignment pins can be received in guide holes 225 (see FIG. 25). In this aspect, ferrule 220 is not substantially altered from its standard shape.

As with the previous embodiment of connector 100, as the fiber connector 200 is a remote grip connector, the ferrule 220 can be essentially adhesive-free. Ferrule 220 can be formed from a ceramic, glass, plastic, or metal material. The choice of suitable materials for the ferrule can be made in accordance with temperature stability parameters.

Figure 14:
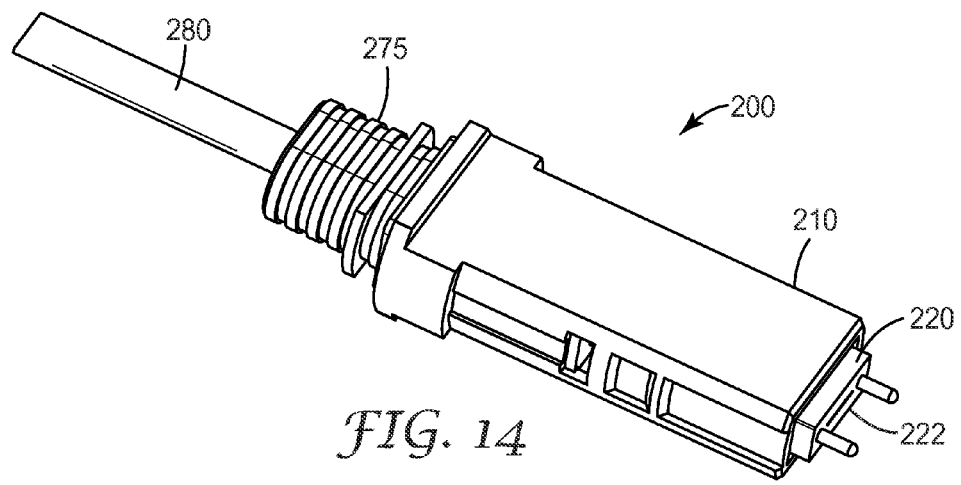
FIG. 14 is an isometric view of an alternative optical fiber connector according to another aspect of the invention.
Figure 15:
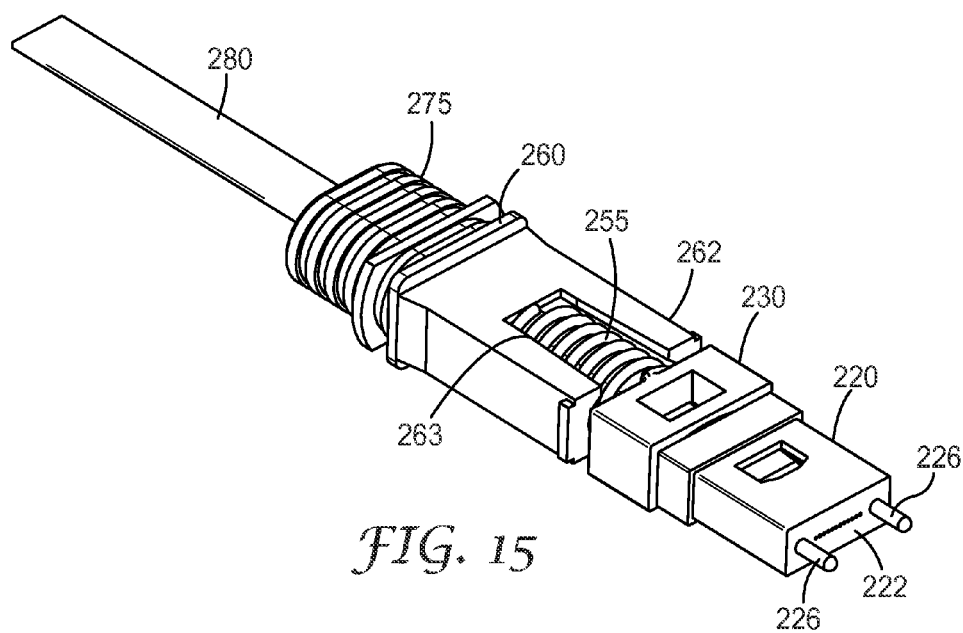
FIG. 15 is another isometric view of the optical fiber connector of FIG. 14 according to another aspect of the invention.
Figure 16:
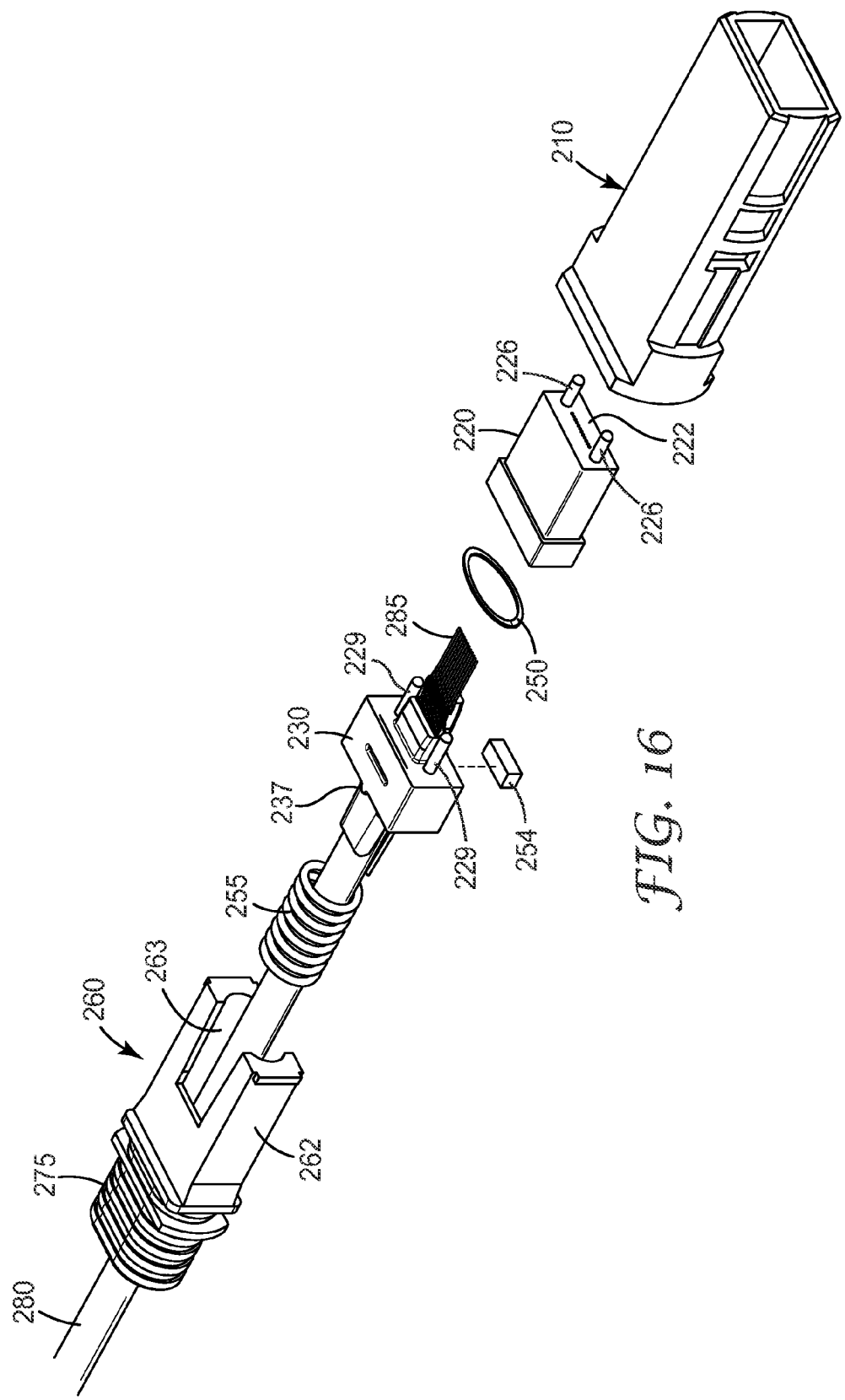
FIG. 16 is an exploded view of the optical fiber connector of FIG. 14 according to another aspect of the invention.

Backbone 260 provides structural support for the connector 200. As shown in FIGS. 14 and 15, backbone 260 includes a front portion 262 configured to secure the connector body 210 (e.g., via a snap or friction fit). The front portion 262 can also include a slot 263 configured to accommodate a resilient element, such as spring 255, which provides a bias force. For example, spring 255 of fiber connector 200 can preload a suitable force onto the connector body of from about 7.8 N to about 11.8 N. In this aspect, backbone 260 does not include a substantial body portion. Alternatively, backbone 260 can include a substantial body portion similar to body portion 164 shown in FIG. 1.

In addition, backbone 260 can further include a mounting structure 275 (opposite the front portion 262) that provides for coupling to a fiber boot (not shown), which can be utilized to protect the optical fiber cable from bend related stress losses. According to an exemplary embodiment of the present invention, connector body 210 and backbone 260 can be formed or molded from a polymer material, although metal and other suitably rigid materials can also be utilized.

Connector 200 further includes a collar body 230 that is disposed within the connector housing and retained therein. According to exemplary embodiments, the collar body 230 is a multi-purpose element that can provide for orderly insertion of the optical fibers into the ferrule 220 and to provide support for a fixing mechanism 254 (see FIG. 16) that secures the fibers within the connector 200. The fixing mechanism 254 provides for remote gripping of the fibers being terminated and is located outside of the ferrule 220. In this respect, the fibers are not attached to the ferrule but axially move within the alignment holes of the ferrule. In one aspect, the fixing mechanism 254 can be located at a remote gripping region 246 that includes a pocket 234 (see e.g., FIG. 18) of the collar body 230. A smaller slot or opening 232 (see e.g., FIG. 17) can be formed opposite pocket 234. Additional slots and openings (not shown) can also be provided in body portion 231 to accommodate for features of the clamping mechanism, if needed. Similar to that described above, fixing mechanism 254 can comprise a mechanical clamp that grips or presses onto the fibers to secure them in place within the collar body 230. Alternatively, fixing mechanism 254 can comprise an adhesive attachment, such as a fast-curing UV or visible light initiated adhesive or a thermal adhesive, such as a hot-melt material.

Figure 17:
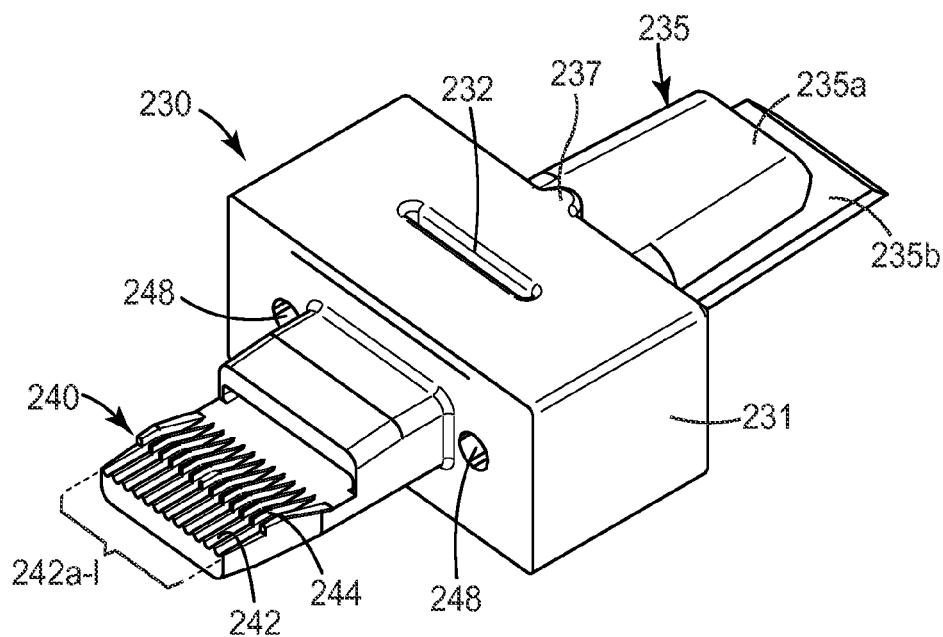
FIG. 17 is an isometric view of the collar body of the optical fiber connector of FIG. 14 according to another aspect of the invention.
Figure 18:
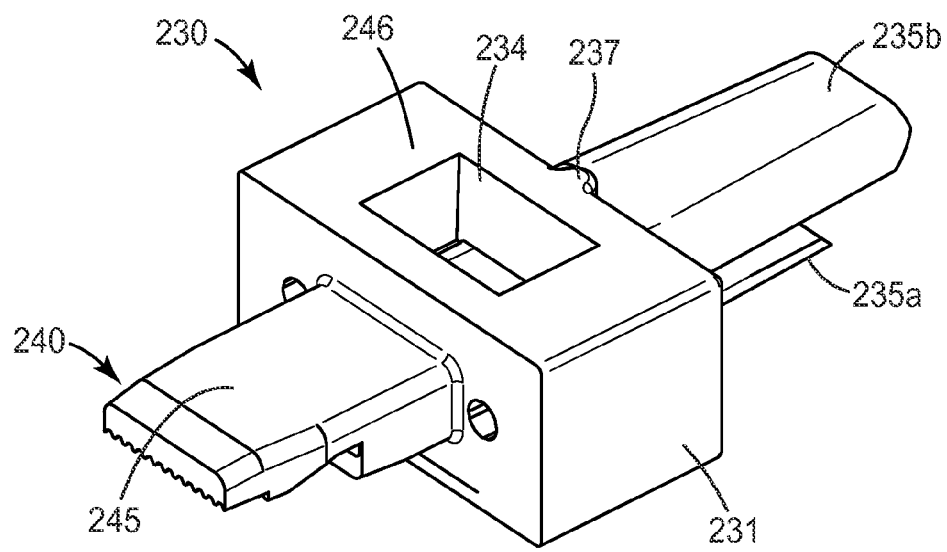
FIG. 18 is another isometric view of the collar body of the optical fiber connector of FIG. 14 according to another aspect of the invention.
Figure 19:
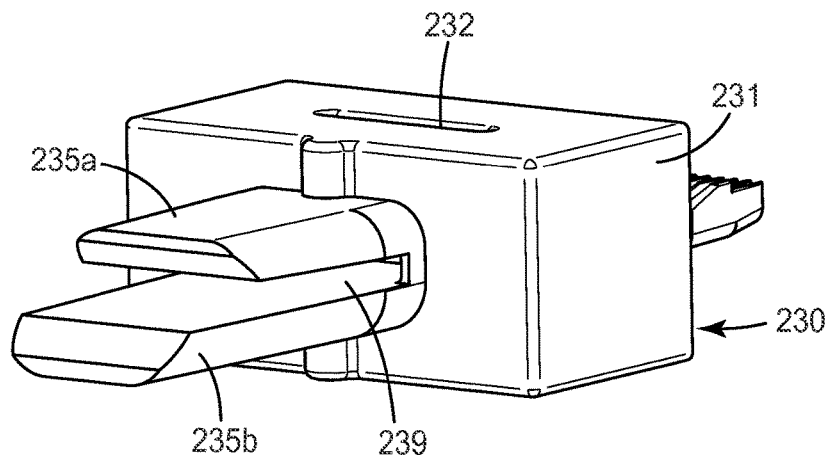
FIG. 19 is another isometric view of the collar body of the optical fiber connector of FIG. 14 according to another aspect of the invention.
Figure 20:
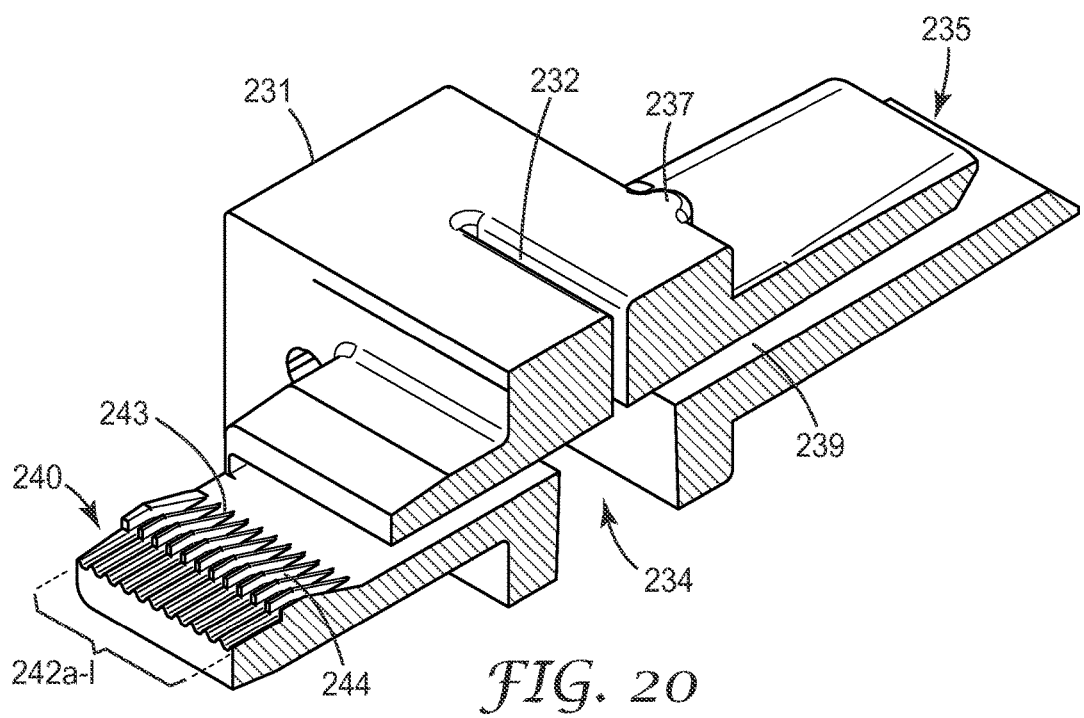
FIG. 20 is an isometric cross-section view of the collar body of the optical fiber connector of FIG. 14 according to another aspect of the invention.

In particular, FIGS. 17 and 18 show a bottom view and a top view, respectively, of collar body 230. Collar body 230 includes a fiber comb portion 240 that is used to support, align and guide the optical fibers to be terminated. The fiber comb portion 240 includes a top surface 245 (see FIG. 18) and an array of grooves 242 (see FIG. 17), located on the underside of surface 245, disposed on an end of the collar body 230 (nearest the ferrule 220 when assembled), with each individual groove or channel 242a-242l configured to guide and support a single optical fiber of the fiber cable 280. The fiber comb portion 240 also includes a ramp section 244 adjacent groove array 242 and disposed between the groove array 242 and the main body portion of the collar body 230. The ramp section 244 includes gradual rising structures 243, such as teeth or walls separating the individual grooves (see e.g., the cross section view shown in FIG. 20) that can be used to help align the individual fibers during the fiber insertion process. The structure of the fiber comb portion 240 separates potentially tangled fibers, arranges the fiber array in a uniform pitch, and allows for straightforward feeding of the fiber array into the ferrule bores.

In addition, connector 200 can provide an anti-rocking mechanism. For example, in another aspect, guide holes 248

(see FIG. 17) can be provided in a front face of collar body 248. These guide holes are configured to support anti-rocking pins (see e.g., pins 229 shown in FIG. 16) which help stabilize the positioning of the collar body with respect to the ferrule. These anti-rocking pins 229 can be inserted in the guide holes 248 such that a portion of each pin is snugly held within the collar body and another portion is received by channel 224 formed in ferrule 220 (see e.g., FIG. 24). In addition, an internal ledge or shoulder can be formed within the interior of connector body 210 to further stabilize the collar body and reduce the impact of side-to-side or rotational forces from rocking against the ferrule.

Figure 21:
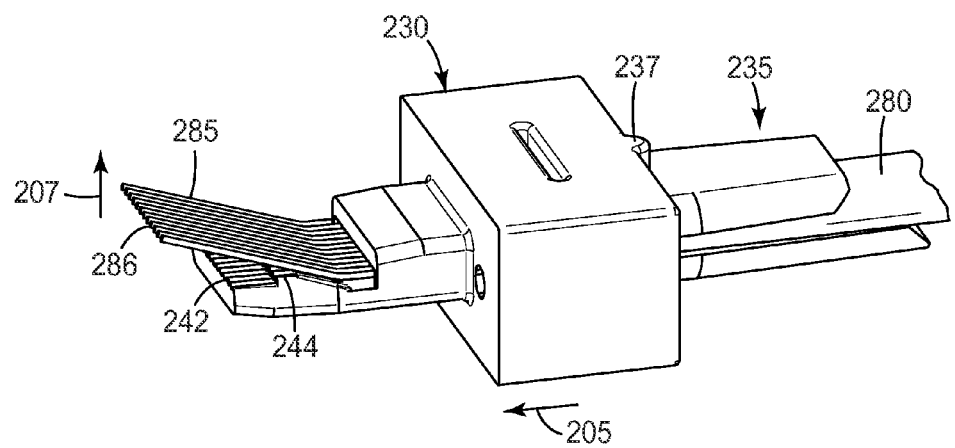
FIG. 21 is an isometric view of the collar body of the optical fiber connector of FIG. 14, with fibers being inserted, according to another aspect of the invention.
Figure 22:
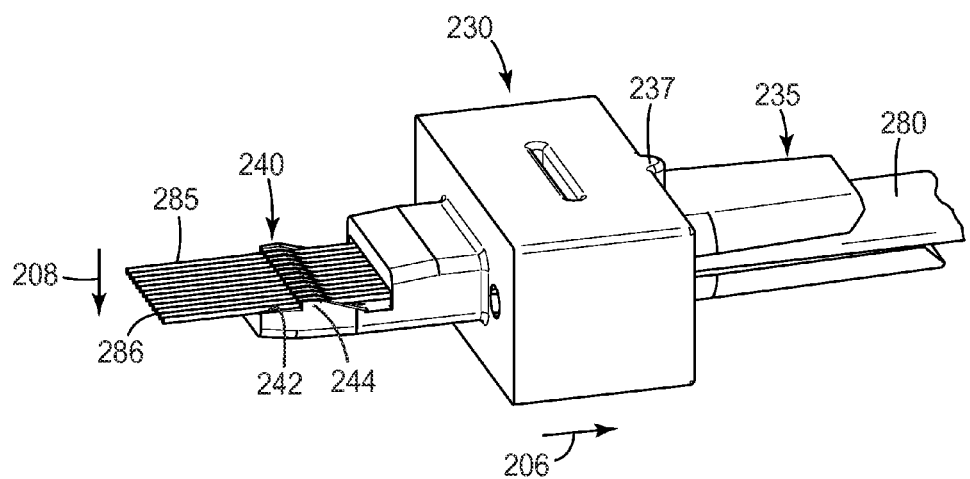
FIG. 22 is another isometric view of the collar body of the optical fiber connector of FIG. 14, with fibers being inserted, according to another aspect of the invention.

Collar body 230 also includes a rear portion 235 having an opening 239 (see FIGS. 19 and 20) that allows for insertion of the fiber cable 180 (see e.g., FIGS. 21 and 22). In one aspect, the rear portion 235 includes extending support structures 235a and 235b (disposed opposite each other about opening 239). In addition, rear portion 235 is also configured to receive and support tension element/spring 255 (see e.g., FIGS. 15 and 16). A contact bump or protrusion 237 can be formed on the rear portion of the collar body 230 to contact spring 255 and centers the force of the spring to the collar body. Thus, when fiber connector 200 is assembled, the resilient element/spring 255 will be disposed between the collar body 230 and the backbone 260.

In the exemplary aspect of optical connector 200, to further help control the force placed on the fiber ends when connected, a small spring element 250 (see FIG. 16), or intermediate spring, such as a flat or leaf spring, can be disposed between the collar body 230 and ferrule 220. In this aspect, intermediate spring 250 can be configured as an oval-shaped spring that fits over the fiber comb portion 240. The spring element 250 enables a desired ratio of spring forces to be applied to the fibers being terminated and helps balance the forces within the connector 200. Thus, after connector mating, the spring element 250 can isolate the ferrule and can absorb any thermal changes in the ferrule 220. Further description of the operation of the spring element/intermediate spring is provided below.

According to an aspect of the present invention, collar body 230 can be formed or molded from a polymer material, although metal and other suitable materials can also be utilized. For example, collar body 230 can comprise an injection-molded, integral material. The choice of suitable materials for the collar body can be made in accordance with the temperature stability parameters.

Field termination of connector 200 can be accomplished in a similar manner to the field termination of connector 100. For example, in conjunction with the illustrations provided in FIGS. 21-24, field termination of connector 200 can be accomplished as follows. In this aspect, the back end of the connector 200, including a boot (not shown), backbone 260, spring 255, and collar body 230, can be threaded onto the fiber cable 280. In this example, fiber cable 280 comprises a ribbon cable having 12 fibers. These fibers are identified as fibers 285, where the fiber ends 286 are individually accessible as the outer jacket portion of the ribbon cable 280 has been stripped off at the fiber ends 286.

In one aspect, the fibers 285 being terminated in connector 200 can comprise standard single mode or multimode optical fibers, such as SMF 28, OM2, OM3, or OM4 fiber ribbon cable (available from Corning Inc.). In an alternative aspect, cable 280 can further include a cable jacket portion and strength members. The strength members can be crimped onto the rear portion of the backbone 260 via a conventional crimp ring or similar device to provide strain relief for the terminated cable. The fibers 285 can be stripped to the desired length. In one aspect, fibers 285 can be stripped to a length of between 8 mm and 15 mm, preferably about 11 mm.

As is shown in FIG. 21, the fiber ribbon 280 can be inserted through the collar body 230, through rear portion 235, in the direction of arrow 205, until the fiber tips extend well beyond the end of the grooves 242 of fiber comb 240. The design of the collar body 230 constrains the ribbon cable 280 on either side to grossly align the fibers with the fiber grooves of the comb portion 240. As the fibers 285 are inserted, the ramp area 244 forces the fiber tips, as a group, to bow or rise upward, in the direction of arrow 207.

Figure 23:
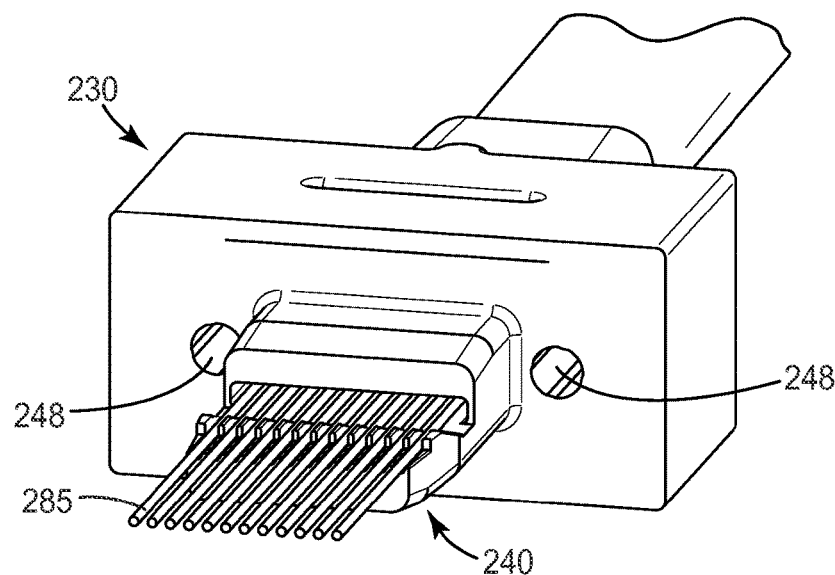
FIG. 23 is an isometric front view of the collar body of the optical fiber connector of FIG. 14, with fibers inserted, according to another aspect of the invention.

As shown in FIG. 22, the ribbon cable 280 can then be pulled back (in the direction of arrow 206), which causes each of the individual fibers to drop or fall (in the direction of 208) into the individual fiber grooves 242 essentially simultaneously, as the un-stripped ribbon coating slides down the ramp 244, allowing the fibers 285 to relax from their bowed/raised state. Thus, as is shown in FIG. 23, all of the individual fibers 285 can be located in their respective individual grooves 242a-242l without the need for precision locating of each individual fiber by the field installer.

Figure 24:
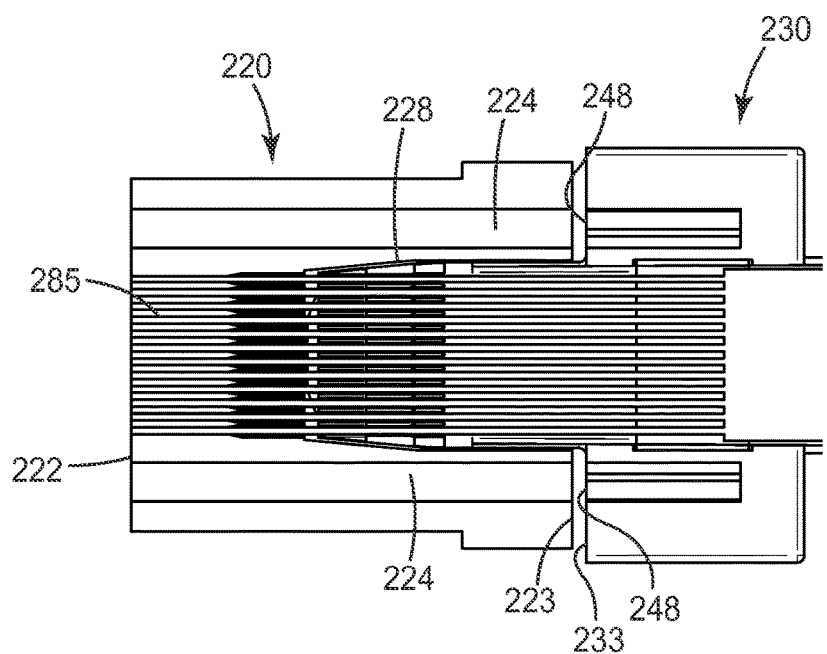
FIG. 24 is a top sectioned view of a portion of the collar body and ferrule of the optical fiber connector of FIG. 14, with fibers inserted, according to another aspect of the invention.
Figure 25:
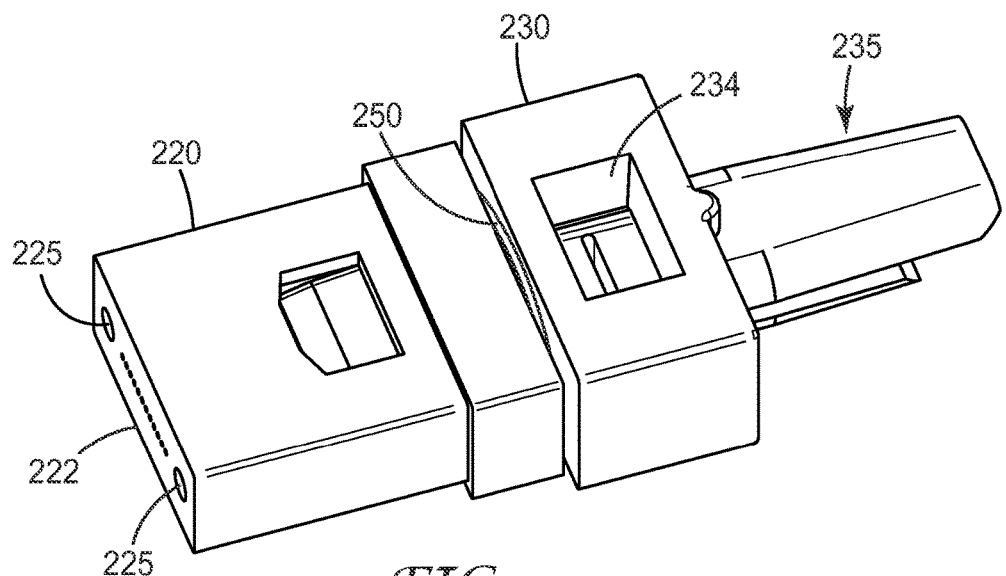
FIG. 25 is an isometric view of the collar body and ferrule of the optical fiber connector of FIG. 14 according to another aspect of the invention.
Figure 26:
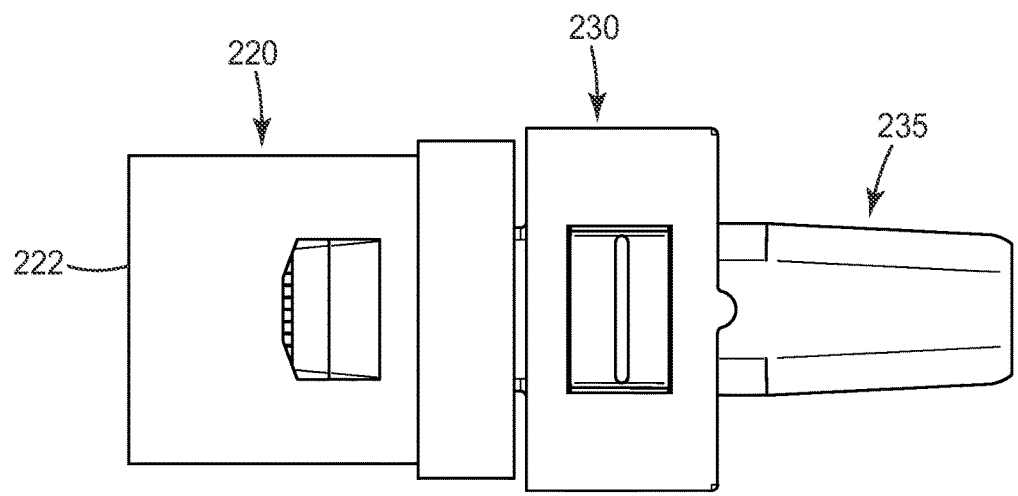
FIG. 26 is another view of the collar body and ferrule of the optical fiber connector of FIG. 14 according to another aspect of the invention.

Once the individual fibers 285 are located within each individual channel or groove 242, the ferrule 220 can be slid over the fiber comb 240 of the collar body, as shown in FIG. 24, thereby positioning the fibers 285 in the proper ferrule bores. In one aspect, the fibers 285 each have an outer diameter of about 125 μm and the ferrule 220 includes an array of lead-in bores 228 each having an opening of about 250 μm.

The fiber tips can then be slid to the front edge of the fiber comb to protect and align the fiber tips. The intermediate spring and ferrule can then be slid into position over the fiber comb. The aligned fiber tips can then be slid into the lead-in bores of the ferrule, until the fiber tips extend beyond the front face 222 of the ferrule.

The ends 286 of fibers 285 may extend some distance from the front face 222 of the ferrule (for later cleaving and polishing). The protrusion allows the installer to cleave and polish the fiber tips at a later time.

The fixing mechanism 254 can then be activated such that the fibers 285 are secured in the remote gripping region 246 of the collar body. As mentioned above, in one aspect, the fixing mechanism 154 comprises a mechanical clamp that grips or otherwise presses onto the fibers to secure them in place within the collar body 230. In an alternative aspect, an adhesive attachment can be utilized. Appropriate adhesives include fast-curing UV or visible light initiated adhesives and thermal adhesives, such as hot-melt material, as described herein.

The connector backbone 260 and connector body housing 210 can then be assembled over the collar body 230/ferrule 220 via snap fit of tab features.

The fiber ends 286 can then be cleaved and polished. In one aspect, a clamping puck can be utilized to hold the assembled connector during cleaving and polishing, as described above.

During connection, the structure of connector 200 can provide for a suitable distribution of forces so that an excessive amount of force is not directly applied to the fiber that could cause damage. By clamping the fibers remotely, a length of the fiber array between the front of the fixing clamp 254 and the end face of the ferrule 222 is free to compress axially as force from a mating connector is applied to the fiber end-faces. As a mating force is applied to the individual fibers, each fiber is pushed reward within the ferrule bores, creating a compressive force, in the forward direction, on the mating fibers. This compressive force is required to maintain fiber-to-fiber physical contact as the assembly expands and contracts during thermal changes.

As mentioned above, a feature of connectors 100, 200 is the intermediate spring (e.g., spring element 150, 250) positioned between the ferrule and collar body. Typical MPO-type connectors make use of an industry standard MT ferrule along with a main compression spring, such as spring 155, 255, to hold the physical contact necessary for proper optical operation. When a connector is mated, the main spring pushes forward against the back of the ferrule and the fibers, which are typically glued within bores in the ferrule in conventional connectors, thereby maintaining the necessary physical contact.

When mated in a coupling, the ferrules of the two connectors are held firmly in contact with each other by the compressive force of the opposing main springs, which urge the ferrules against each other. Latching features (not shown) keep the respective springs compressed when the connectors are mated in compliance with TIA/EIA 604-5-A FOCIS-5 Type MPO standard.

In the aspects described above with respect to connectors 100, 200, the connector configurations of the present invention can further achieve and control physical contact of the fiber arrays with the intermediate spring. When connectors are mated, the intermediate spring provides that each fiber in the first connector makes secure and tunable physical contact to an opposing fiber of the second connector without placing a damaging load force on each mated fiber.

In one aspect of the invention, a preferred contact force between mated fibers can be from about 30 gram force to about 80 gram force. To assure the desired 30 gram force to 80 gram force of physical contact on each fiber in an exemplary 12 fiber array, it is desired that nearly all of the mating force be shared, and shared evenly, by the fibers, with very little force being applied to the ferrule. To achieve this mating condition in connectors 100, 200, the intermediate spring 150, 250 is disposed between the collar body and the ferrule. The intermediate spring urges the ferrule forward, holding it firmly against a ledge interface in the outer connector body (e.g., connector body 110, 210) throughout the entire connector assembly process. With the ferrule held in this position, and the intermediate spring slightly compressed, the fiber array ends can be polished until they are substantially flush with the ferrule face (e.g., face 122, 222). This configuration and process allows the fibers to have a substantially uniform length and be flush with the ferrule face, where the fiber ends can be cleaned prior to mating in a straightforward manner.

The intermediate spring compresses further as the ferrule is pushed back by the mating connector during a connection. With connectors 100, 200, because the fibers are remotely gripped, the ferrule (120, 220) is permitted to move axially along the fiber array, rearward towards the collar body (130, 230). As the ferrule moves back, most of the force from the main spring is then transferred to the fiber array ends.

Using this approach, a multi fiber connector can be designed to place a certain amount of axial compression (e.g., between 0 and 11.8 N) on the fiber array by adjusting the compression rate of the intermediate spring. A certain amount of physical contact is necessary to ensure proper optical performance of the connector.

As defined in TIA/EIA MPO, FOCIS-5 standard noted above, the mating force of a standard-compliant MPO-type connector is not to exceed 11.8 N of force when fully compressed. In conventional connectors, the required force is supplied via the main spring. Assuming 100% of the force from the main spring is applied to the fiber array ends, in a 12 fiber system, the resulting force will be about 100 gram force of physical contact per fiber. Experiments and modeling predict that about 100 gram force on a fiber end will result in about a 14 μm displacement of the fiber end-face (depending on the type of fiber), towards the collar body. The investigators conducted modeling experiments which indicate that part of this displacement is axial compression of the fiber and part is realized as a bowing of the fiber subjected to the applied force. Furthermore, such modeling indicates that excessive bowing of the fiber may introduce tensile stress on the outside of the fiber. High levels of tensile stress can decrease the lifetime of the fiber.

As described herein, according to aspects of the present invention, the main spring force applied to the fiber array can be offset by use of an intermediate spring. For example, when applying 1200 gram force of main spring force to a 12 fiber array, an intermediate spring having a spring compression of 200 gram force can be used to effectively transfer that 200 gram force from the fiber ends back to the main spring. The net force applied to the fiber ends will be the difference (1000 gram force or 83 gram force per fiber).

The field installable connectors described herein can be used in a variety of applications, including fiber-to-the-home installations, fiber-to-the-antenna, local area networks, data center connections, and high performance computing, to name a few.

Various modifications, equivalent processes, as well as numerous structures to which the present invention may be applicable will be readily apparent to those of skill in the art to which the present invention is directed upon review of the present specification.

We claim:

1. An optical fiber connector for terminating a fiber cable comprising a plurality of optical fibers, comprising:
   an outer connector housing;
   a ferrule essentially free of adhesive;
   a backbone; and
   a collar body disposed between the ferrule and backbone, wherein the collar body includes a remote gripping region to remotely grip the plurality of optical fibers outside of the ferrule,
   wherein the collar body includes a fiber comb portion disposed at a front portion of the collar body, wherein the fiber comb portion includes an array of grooves, with each groove configured to guide an optical fiber disposed therein.

2. The optical fiber connector of claim 1, further comprising:
   a resilient element disposed between the backbone and a rear portion of the collar body; and
   an intermediate spring element disposed between a front portion of the collar body and a rear portion of the ferrule.

3. The optical fiber connector of claim 2, wherein the intermediate spring element has a compression value of from about 300 gram force to about 750 gram force.

4. The optical fiber connector of claim 3, wherein the intermediate spring element has a compression value of from about 500 gram force to about 550 gram force.

5. The optical fiber connector of claim 1, wherein the remote gripping region is configured to receive a clamping mechanism that secures the axial position of the plurality of optical fibers within in the collar body.

6. The optical fiber connector of claim 1, wherein the remote gripping region is configured to receive an adhesive that secures the axial position of the plurality of optical fibers within in the collar body.

7. The optical fiber connector of claim 1, further comprising a ramp section adjacent the groove array, the ramp section including a gradual rising portion.

8. The optical fiber connector of claim 7, wherein the fiber comb portion separates potentially tangled fibers, arranges the plurality of fibers in a uniform pitch, and provides for straightforward feeding of the fiber array into ferrule bores during a fiber cable insertion process.

9. An optical fiber connector for terminating a fiber cable comprising a plurality of optical fibers, comprising:
   an outer connector housing;
   a ferrule;
   a backbone; and
   a collar body disposed between the ferrule and backbone, wherein the collar body includes a fiber comb portion disposed at a front portion of the collar body, wherein the fiber comb portion includes an array of grooves, with each groove configured to guide an optical fiber disposed therein into the ferrule.

10. The optical fiber connector of claim 9, further comprising a ramp section adjacent the groove array, the ramp section including a gradual rising portion.

11. The optical fiber connector of claim 10, wherein the fiber comb portion separates potentially tangled fibers, arranges the plurality of fibers in a uniform pitch, and provides for straightforward feeding of the fiber array into ferrule bores during a fiber cable insertion process.

12. The optical fiber connector of claim 9, wherein the collar body includes a remote gripping region to remotely grip the plurality of optical fibers outside of the ferrule.

13. The optical fiber connector of claim 9, further comprising:
   a resilient element disposed between the backbone and a rear portion of the collar body; and
   an intermediate spring element disposed between a front portion of the collar body and a rear portion of the ferrule.

14. An optical fiber connector for terminating a fiber cable comprising one or more optical fibers, comprising:
   an outer connector housing;
   a ferrule;
   a backbone;
   a collar body disposed between the ferrule and backbone;
   a tension element disposed between the backbone and a rear portion of the collar body; and
   an intermediate spring element disposed between a front portion of the collar body and a rear portion of the ferrule.

15. The connector of claim 14, wherein the outer connector housing is configured to be received in a MPO receptacle.

16. The connector of claim 14, wherein the ferrule comprises an MT ferrule.

17. The connector of claim 14, wherein the backbone further includes a mounting structure that provides for coupling to a fiber boot.

18. An optical fiber connector for terminating a fiber cable comprising a plurality of optical fibers, comprising:
   an outer connector housing;
   a ferrule;
   a backbone; and
   a collar body disposed between the ferrule and backbone, wherein collar body includes at least two guide holes configured to secure anti-rocking pins inserted in the guide holes, the anti-rocking pins, when mounted, extending into corresponding channels formed in the ferrule.

19. The optical fiber connector of claim 18, wherein the outer connector housing includes an internal ledge formed within an interior portion of the outer connector housing on which the collar body rests to further stabilize the collar body and reduce side-to-side forces.

* * * * *